(12) United States Patent
Mukasa et al.

(10) Patent No.: US 6,640,036 B2
(45) Date of Patent: Oct. 28, 2003

(54) OPTICAL FIBER AND OPTICAL COMMUNICATION SYSTEM USING THIS OPTICAL FIBER

(75) Inventors: Kazunori Mukasa, Chiyoda-ku (JP); Naomi Kumano, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 60 days.

(21) Appl. No.: 09/950,646

(22) Filed: Sep. 13, 2001

(65) Prior Publication Data

US 2002/0097971 A1 Jul. 25, 2002

(30) Foreign Application Priority Data

Nov. 28, 2000 (JP) ........................................ 2000-361390

(51) Int. Cl.$^7$ ................................................. G02B 6/02
(52) U.S. Cl. ........................................ 385/124; 385/126
(58) Field of Search ................................. 385/123–128

(56) References Cited

U.S. PATENT DOCUMENTS 6,169,837 B1 * 1/2001 Kato et al. ................... 385/127
6,477,306 B2 * 11/2002 Kato et al. ................... 385/123
6,487,353 B2 * 11/2002 Kato et al. ................... 385/127

OTHER PUBLICATIONS

Kazunori Mukasa, et al. "Dispersion–Managed Transmission Lines with Reverse–Dispersion Fiber" Furukawa Review, No. 19. 20002 pp. 5–9.

* cited by examiner

Primary Examiner—Robert H. Kim
Assistant Examiner—Richard Kim
(74) Attorney, Agent, or Firm—Oblon, Spivak, McClelland, Maier & Neustadt, P.C.

(57) ABSTRACT

The present invention resides in an optical fiber able to form an optical transmitting line for wavelength division multiplexing transmission in a wavelength band of 1.5 $\mu$m using a Raman amplifier, and an optical communication system using this optical fiber. The optical fiber has an effective core area from 40 $\mu$m$^2$ to 60 $\mu$m$^2$ in a set wavelength band of at least one portion of a wavelength band of 1.5 $\mu$m; a dispersion value from 4 to 10 ps/nm/km at a wavelength of 1.55 $\mu$m; a dispersion slope set to a positive value equal to or smaller than 0.04 ps/nm$^2$/km in a wavelength band of 1.55 $\mu$m; and a zero dispersion wavelength equal to or smaller than 1.4 $\mu$m. Further, a cutoff wavelength is set to be equal to or smaller than 1.5 $\mu$m at a length of 2 m, and a bending loss is set to be equal to or smaller than 5 dB/m at a diameter of 20 mm in the wavelength band of 1.5 $\mu$m. In a refractive index profile of the optical fiber, for example, a relative refractive index difference $\Delta 1$ of a first glass layer as an innermost layer with respect to a reference layer, and a relative refractive index difference $\Delta 3$ of the refractive index of a third glass layer as a third layer from an inner side with respect to the reference layer are set to be positive. Further, a relative refractive index difference $\Delta 2$ of a second glass layer as a second layer from the inner side with respect to the reference layer is set to be negative.

7 Claims, 2 Drawing Sheets

OPTICAL FIBER AND OPTICAL COMMUNICATION SYSTEM USING THIS OPTICAL FIBER

FIELD OF THE INVENTION

This invention relates to an optical fiber used in optical transmission such as wavelength division multiplexing (WDM) transmission, etc. in a wavelength band of e.g., 1.5 μm, etc., and optical communication systems using this optical fiber.

BACKGROUND OF THE INVENTION

A communication information capacity tends to be greatly increased as information society is developed. Techniques of the wavelength division multiplexing transmission (WDM transmission) and time division multiplexing (TDM) transmission are noticed as such information is increased. This wavelength division multiplexing transmission uses a system for transmitting signals of plural wavelengths by one optical fiber. Therefore, this system is an optical transmitting system suitable for high capacity and high bit-rate transmission. The wavelength division multiplexing transmission technique is vigorously studied at present.

It is considered at present that the wavelength division multiplexing transmission is performed in a wavelength band of 1.55 μm as a gain band of an erbium-doped optical fiber amplifier. The wavelength band of 1.55 μm is a wavelength band with 1550 nm in wavelength approximately as a center, e.g., as in a wavelength band from 1530 nm to 1570 nm.

However, there are problems of an increase in power of an optical signal and a non-linear phenomenon due to an interaction between signals, etc. to perform the wavelength division multiplexing transmission. Therefore, for example, it is reported in a society report document OFC' 97 TuN1b of Japan, etc. to consider that a non-linear refractive index difference ($n_2$) is reduced and restrained to restrain the non-linear phenomenon.

It is also noticed to consider that an effective core area ($A_{eff}$) of the optical fiber is increased together with this reduction in the non-linear refractive index difference. Distortion $\phi_{NL}$ of a signal due to the non-linear phenomenon is generally represented by the following formula (1). Therefore, when the effective core area of the optical fiber is increased, the waveform distortion of a signal due to the non-linear phenomenon can be reduced.

$$\phi_{NL} = (2\pi \times n_2 \times L_{eff} \times P)/(\lambda \times A_{eff}) \quad (1)$$

In the formula (1), $\pi$, $n_2$, $L_{eff}$, P and $\lambda$ respectively designate a ratio of the circumference of a circle to its diameter, a non-linear refractive index, an effective optical fiber length, signal power and a signal optical wavelength.

Accordingly, it is very important to enlarge the effective core area in the optical fiber used for e.g. the wavelength multiplexing transmission, and this enlargement is very noticed as reported in society report documents OFC'96 WK15 and OFC'97 YuN2 of Japan.

SUMMARY OF THE INVENTION

The present invention provides an optical fiber and an optical communication system using this optical fiber.

The optical fiber of the invention comprises:

an effective core area from 40 μm² to 60 μm² in a set wavelength band of at least one portion of a wavelength band of 1.5 μm;

a dispersion value set to 4 ps/nm/km or more and 10 ps/nm/km or less at a wavelength of 1.55 μm;

a dispersion slope set to a positive value equal to or smaller than 0.04 ps/nm²/km in a wavelength band of 1.55 μm; and a zero dispersion wavelength equal to or smaller than 1.4 μm.

BRIEF DESCRIPTION OF THE DRAWINGS

Exemplary embodiments of the invention will now be described in conjunction with drawings, in which.

DETAILED DESCRIPTION

In an optical fiber, a diffusion slope is generally increased when an effective core area is enlarged. The problem of a difference in chromatic dispersion every wavelength is caused by the increase in dispersion slope, and becomes a great obstacle in wavelength division multiplexing transmission. Therefore, a reduction in dispersion slope is a very important.

It is studied in recent years that a Raman amplifier is applied instead of the wavelength division multiplexing transmission using the erbium-doped optical fiber amplifier, and the wavelength division multiplexing transmission is performed in e.g., a wavelength band of 1.5 μm. The wavelength band of 1.5 μm is a wavelength band with 1500 nm in wavelength approximately as a center, e.g. as in a wavelength band from 1500 nm to 1650 nm. Hereafter, the term of the wavelength band of 1.5 μm is used as this meaning.

The Raman amplifier is an optical amplifier utilizing Raman amplification described below. The Raman amplification is an amplifying method of an optical signal utilizing a so-called Raman amplifying phenomenon. In the Raman amplifying phenomenon, when pumping light as strong light is incident to the optical fiber, a gain appears about 100 nm on a long wavelength side from a pumping light wavelength by induced Raman scattering, and signal light in a wavelength area having this gain is amplified when this signal light is incident to the optical fiber in this pumped state.

Therefore, when the wavelength division multiplexing transmission in a wavelength band of 1.5 μm is performed by using the Raman amplifier, pumping light having about 1.4 μm in wavelength is incident to the optical fiber.

However, in the optical fiber conventionally considered for the wavelength division multiplexing transmission, wavelength dispersion at a wavelength of 1.55 μm approximately ranges from −4 ps/nm/km to +6 ps/nm/km, and its dispersion slope is 0.05 ps/nm²/km or more. Therefore, in the optical fiber conventionally considered for the wavelength division multiplexing transmission, a zero dispersion wavelength becomes 1.4 μm or more so that an interference of the pumping light of about 1.4 μm in wavelength and four-wave mixing, etc. is caused.

In an optical fiber and an optical communication system in one aspect of the invention, no problem of an interference with pumping light, etc. is almost caused even when the wavelength division multiplexing transmission in a wavelength band of 1.5 μm is performed by using e.g., the Raman amplifier, and the optical fiber and the optical communication system have a low dispersion slope with low non-linearity.

Figure 1:
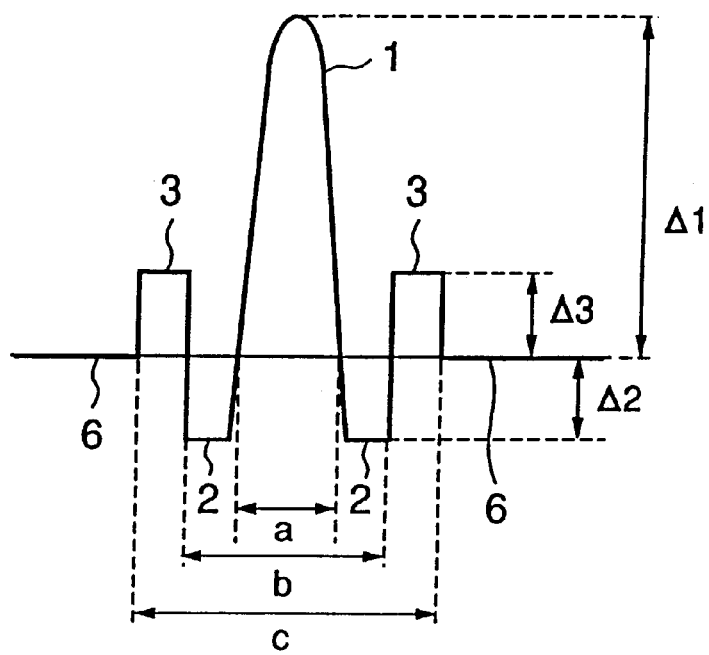
FIG. 1A is an explanatory view showing the construction of a refractive index profile in a first embodiment of an optical fiber in the invention.
FIG. 1B is an explanatory view showing a sectional construction of the optical fiber in the first embodiment of the optical fiber in the invention.
Figure 1:
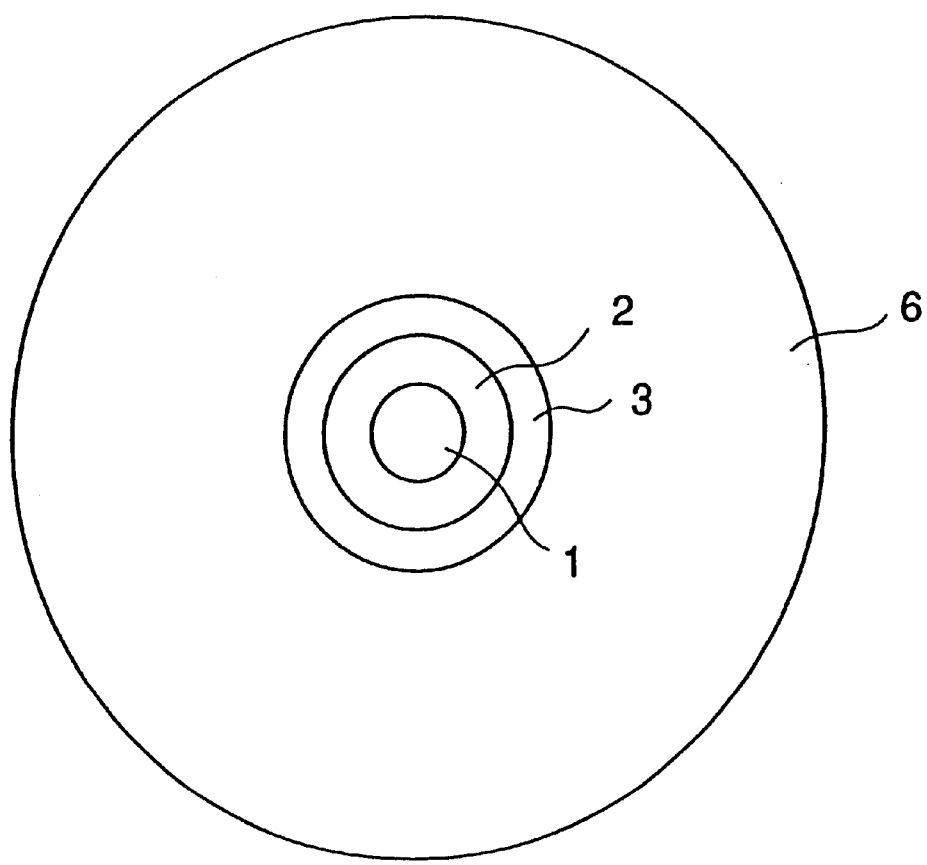

Concrete embodiments of the invention will next be explained on the basis of the drawings. FIG. 1A shows a refractive index distribution profile in a first embodiment of an optical fiber in the invention. The profile of the refractive index distribution of the optical fiber can be set to refractive index profiles in various modes. However, in the first embodiment, a refractive index profile as shown in FIG. 1A is adopted. This refractive index profile is relatively simple in structure, and is easily designed and controlled in refractive index structure.

The optical fiber of the first embodiment has multiple (four layers here) glass layers (a first glass layer 1, a second glass layer 2, a third glass layer 3 and a reference layer 6) adjacent to each other and having different compositions. As shown in FIG. 1B, these glass layers are formed in a concentric shape. The reference layer 6 as an outermost layer is a layer constituting a reference of the refractive index distribution among the four glass layers. Three glass layers constructed by the first glass layer 1, the second glass layer 2 and the third glass layer 3 are formed inside this reference layer 6.

In the optical fiber of the first embodiment, a maximum refractive index of the first glass layer 1 formed on an innermost side of the optical fiber, and a maximum refractive index of the third glass layer 3 as a third layer from an inner side are set to be higher than the refractive index of the reference layer 6. Further, in the optical fiber of the first embodiment, a minimum refractive index of the second glass layer 2 as a second layer from the inner side of the optical fiber is set to be lower than the refractive index of the reference layer 6. A refractive index distribution shape of the first glass layer 1 is formed in α shape.

In the optical fiber of the first embodiment, Δ1>Δ3>Δ2 is formed when a maximum relative refractive index difference of the first glass layer 1 with respect to the reference layer 6 is set to Δ1, a minimum relative refractive index difference of the second glass layer 2 with respect to the reference layer 6 is set to Δ2, and a maximum relative refractive index difference of the third glass layer 3 with respect to the reference layer 6 is set to Δ3.

In this specification, the refractive index of a maximum refractive index portion of the first glass layer is set to n1, the refractive index of a minimum refractive index portion of the second glass layer is set to n2, the refractive index of a maximum refractive index portion of the third glass layer is set to n3, and the refractive index of the reference layer is set to n6. The respective relative refractive index differences Δ1, Δ2 and Δ3 are respectively defined by the following approximate formulas (2) to (4).

$$\Delta 1 \cong \{(n1-n6)/n6\} \times 100 \quad (2)$$

$$\Delta 2 \cong \{(n2-n6)/n6\} \times 100 \quad (3)$$

$$\Delta 3 \cong \{(n3-n6)/n6\} \times 100 \quad (4)$$

The optical fiber of the first embodiment has the refractive index profile shown in FIG. 1A, and also has the following construction. Namely, the optical fiber of the first embodiment has a construction in which an effective core area ranges from 40 μm² to 60 μm² in a set wavelength band of at least one portion of a wavelength band of 1.5 μm. This optical fiber also has a construction in which a dispersion value at a wavelength of 1.55 μm is set to 4 ps/nm/km or more and is set to 10 ps/nm/km or less. This optical fiber also has a construction in which a dispersion slope in the wavelength band of 1.55 μm is set to a positive value equal to or smaller than 0.04 ps/nm²/km. This optical fiber further has a construction in which a zero dispersion wavelength is set to 1.4 μm or less. For example, the set wavelength band is a wavelength band of 1.55 μm.

Further, the optical fiber of the first embodiment has a construction in which a cutoff wavelength at a length of 2 m is set to 1.5 μm or less, and a bending loss at a diameter of 20 mm in the wavelength band of 1.5 μm is set to 5 dB/m or less.

The present inventors have considered that the optical fiber of the first embodiment is applied to wavelength division multiplexing transmission in the wavelength band of 1.5 μm, and the following consideration is taken into account with respect to the refractive index profile shown in FIG. 1A.

Namely, respective relative refractive indexes Δ1, Δ2, Δ3, α and respective diameters a, b, c are set to parameters, and these values are set to various values. When a single mode condition is satisfied, a profile range is searched such that the dispersion slope (an average value of the dispersion slope) in the wavelength band of 1.55 μm among the wavelength band of 1.5 μm becomes a positive value equal to or smaller than 0.03 ps/nm²/km. An optimum profile of the first embodiment is calculated from the relation of the effective core area and a bending loss value in this profile range.

As a result, when no relative refractive index difference Δ1 is set to lie within a range equal to or smaller than 0.6%, it has been found that it is difficult to set the effective core area to 40 μm² or more when the dispersion slope is set to a positive value equal to or smaller than 0.03 ps/nm²/km. Further, it has been found that the bending loss becomes a value greater than 5 dB/m when the relative refractive index difference Δ1 is set to be smaller than 0.5%. Therefore, the range of the relative refractive index difference Δ1 is set to a range from 0.5% to 0.6%.

The relative refractive index difference Δ1 is set to lie within the above range and the constant α not increasing the dispersion slope is calculated when the effective core area is enlarged. It is then judged that the constant α is suitably set to 5.0 or more. In this condition, the refractive index profile is calculated such that the effective core area can be set to 40 μm² or more and 60 μm or less, and the dispersion slope can be set to a positive value equal to or smaller than 0.04 ps/nm²/km while the bending loss value at the diameter of 20 mm is held to be equal to or smaller than 5 dB/m.

As a result, when the relative refractive index difference Δ2 is set to be smaller than −0.4%, it is difficult to set the effective core area to be equal to or greater than 40 μm², and the bending loss value at the diameter of 20 mm also becomes a value greater than 5 dB/m. Further, when the relative refractive index difference Δ2 is set to be greater than −0.1%, the dispersion slope becomes a value greater than 0.04 ps/nm²/km. Therefore, the range of the relative refractive index difference Δ2 is set to a range from −0.4% to −0.1%.

When the relative refractive index difference Δ3 is set to be smaller than 0.1%, it is difficult to set the effective core area to be equal to or greater than 40 μm², and the bending loss value at the diameter of 20 mm also becomes a value greater than 5 dB/m. Further, when the relative refractive index difference Δ3 is set to be greater than 0.4%, a cutoff wavelength λc becomes larger than 1.5 μm. Therefore, the range of the relative refractive index difference Δ3 is set to a range from 0.1% to 0.4%.

The refractive index profile in each of concrete examples 1 to 4 shown in table 1 is determined from the above consideration results.

TABLE 1

| UNIT | Δ1 % | α | Δ2 % | Δ3 % | a:b:c | CORE DIAMETER μm | DISPERSION ps/nm/km | SLOPE ps/nm²/km | Aeff μm² | λc nm | BENDING LOSS (MEASURING VALUE AT 20 mm φ) dB/m | λo nm |
|---|---|---|---|---|---|---|---|---|---|---|---|---|
| CONCRETE EXAMPLE 1 | 0.58 | 10 | −0.30 | 0.20 | 1:1.9:2.5 | 12.9 | 7.4 | 0.024 | 41.1 | 1446 | 3.5 | 1242 |
| CONCRETE EXAMPLE 2 | 0.57 | 10 | −0.30 | 0.25 | 1:1.8:2.4 | 12.8 | 6.3 | 0.026 | 43.5 | 1469 | 3.0 | 1038 |
| CONCRETE EXAMPLE 3 | 0.55 | 12 | −0.20 | 0.25 | 1:1.8:2.3 | 12.4 | 7.1 | 0.034 | 48.6 | 1341 | 2.0 | 1341 |
| CONCRETE EXAMPLE 4 | 0.52 | 6 | −0.20 | 0.20 | 1:1.7:2.2 | 13.2 | 6.9 | 0.039 | 52.4 | 1446 | 4.0 | 1373 |

λ = 1550 nm

The table 1 shows setting examples of the respective relative refractive index differences Δ1, Δ2, Δ3, and examples of the value of the constant α, and a ratio of a:b:c, a core diameter and simulation results of characteristics of the optical fiber when an outside diameter of the first glass layer 1 is set to a, an outside diameter of the second glass layer 2 is set to b, and an outside diameter of the third glass layer 3 is set to c.

In the table 1 and tables shown below, respective values of the core diameter and the optical fiber characteristics show the following values. Namely, the core diameter shows the outside diameter of the second layer (the value of b in a corresponding figure among FIGS. 1 to 3). Dispersion shows a dispersion value at a wavelength of 1.55 μm. Slope shows an average value of the dispersion slope (dispersion gradient) in a wavelength band of 1.55 μm, and becomes a value equal to the dispersion slope in a wavelength band of 1.5 μm. $A_{eff}$ shows an effective core area when 1.55 μm signal is propagated. λc shows a cutoff wavelength at a length of 2 m. Bending loss shows a value of the bending loss at a diameter of 20 mm with respect to light of 1.55 μm in wavelength. $\lambda_0$ shows a zero dispersion wavelength.

In the optical fiber of the first embodiment, the zero dispersion wavelength can be set to be equal to or smaller than 1.4 μm by the refractive index profile shown in FIG. 1A and the table 1, and this optical fiber has characteristics shown in the table 1 at a wavelength of 1.55 μm and in a wavelength band including this wavelength 1.55 μm. Namely, in the optical fiber of the first embodiment, the dispersion value at the wavelength of 1.55 μm is set to 4 ps/nm/km or more, and 10 ps/nm/km or less, and the dispersion slope in the wavelength band of 1.55 μm is set to a positive value equal to or smaller than 0.04 ps/nm²/km so that the zero dispersion wavelength can be set to be equal to or smaller than 1.4 μm.

Accordingly, in the optical fiber of the first embodiment, when Raman amplification is performed in the wavelength band of 1.5 μm, it is possible to restrain the generation of an interference of pumping light of about 1.4 μm in wavelength and four-wave mixing, etc.

Further, since the dispersion value at the wavelength of 1.55 μm is set to be equal to or smaller than 10 ps/nm/km as mentioned above, no optical fiber of the first embodiment has large local dispersion as in a case in which the dispersion value is set to be greater than 10 ps/nm/km. Accordingly, the optical fiber of the first embodiment can restrain distortion due to dispersion, and can also reduce the difference in dispersion between wavelengths.

Further, the optical fiber of the first embodiment can reduce the difference in dispersion between wavelengths since an absolute value of the dispersion slope is reduced by setting the dispersion slope in the wavelength band of 1.55 μm to a positive value equal to or smaller than 0.04 ps/nm²/km. Accordingly, the optical fiber of the first embodiment becomes an optical fiber suitable for the wavelength division multiplexing transmission in the wavelength band of 1.5 μm to which the Raman amplifier is applied.

Further, since the absolute value of the dispersion slope in the optical fiber of the first embodiment is small, the dispersion slope of the optical fiber of the first embodiment can be easily compensated by connecting e.g., a dispersion slope compensating fiber (DSCF), etc. conventionally developed to the optical fiber of the first embodiment.

As is well known, there are a Raman amplifier of a distribution type and a Raman amplifier of a concentration type in the Raman amplifier. When the Raman amplifier of the concentration constant type is applied to the wavelength division multiplexing transmission, no nonlinear phenomenon within the optical fiber can be neglected. In this case, in the optical fiber of the first embodiment, the effective core area is set to 40 μm² or more equal to or greater than that of the conventional optical fiber for the wavelength division multiplexing transmission in the set wavelength band of at least one portion of the wavelength band of 1.5 μm. Accordingly, the optical fiber of the first embodiment can also restrain signal light distortion due to the nonlinear phenomenon by performing the wavelength division multiplexing transmission in this set wavelength band.

Further, when the Raman amplifier of the distribution constant type is applied, maximum input power of the optical fiber can be reduced and restrained so that the signal light distortion due to the nonlinear phenomenon within the optical fiber can be reliably restrained.

When the effective core area is too large, a reduction in efficiency of the Raman amplifier is caused. However, in the optical fiber of the first embodiment, the effective core area is set to 60 μm² or less in the set wavelength band of at least one portion of the wavelength band of 1.5 μm. Accordingly, in the optical fiber of the first embodiment, the reduction in efficiency of the Raman amplifier can be restrained by performing the wavelength division multiplexing transmission using the Raman amplifier in this set wavelength band.

Since the cutoff wavelength is set to 1.5 μm in wavelength or less in the optical fiber of the first embodiment, a single mode operation can be precisely performed in a wavelength band equal to or greater than 1.5 μm in wavelength. Further, the optical fiber of the first embodiment can also restrain the bending loss when the optical fiber is formed as a cable.

Accordingly, the optical fiber of the first embodiment becomes an optical fiber suitable for the wavelength division multiplexing transmission in the wavelength band of 1.5 μm 2 shown in the table 1. The outside diameter ratio a:b:c:d of the first to fourth glass layers is a ratio when the outside diameter of the first glass layer 1 is a, the outside diameter of the second glass layer 2 is b, the outside diameter of the third glass layer 3 is c, and the outside diameter of the fourth glass layer 4 is d.

TABLE 2

| UNIT | Δ4 % | a:b:c:d | CORE DIAMETER μm | DISPERSION ps/nm/km | SLOPE ps/nm²/km | Aeff μm² | λc nm | BENDING LOSS (MEASURING VALUE AT 20 mm φ) dB/m | λo nm |
|---|---|---|---|---|---|---|---|---|---|
| CONCRETE EXAMPLE 5 | −0.20 | 1:1.8:2.5:3.0 | 13.3 | 7.5 | 0.031 | 43.0 | 1246 | 3.0 | 1308 |
| CONCRETE EXAMPLE 6 | −0.15 | 1:1.8:2.5:3.0 | 13.1 | 7.2 | 0.028 | 43.2 | 1307 | 3.0 | 1293 |
| CONCRETE EXAMPLE 7 | −0.10 | 1:1.8:2.5:3.0 | 13.0 | 6.9 | 0.027 | 43.3 | 1379 | 3.0 | 1294 |
| CONCRETE EXAMPLE 8 | −0.10 | 1:1.8:2.5:4.0 | 12.8 | 7.3 | 0.030 | 43.1 | 1298 | 3.0 | 1307 |

λ = 1550 nm and able to efficiently perform the Raman amplification. An optical communication system applying the optical fiber of the first embodiment thereto as an optical transmission line can be set to a wavelength division multiplexing transmission system in the wavelength band of 1.5 μm, etc. using e.g. the Raman amplification with high quality.

When the restriction of an influence of the four-wave mixing is seriously considered in the first embodiment and second and third embodiments shown below, it is desirable to set the dispersion value to 6 ps/nm/km or more as shown in each table.

Figure 2:
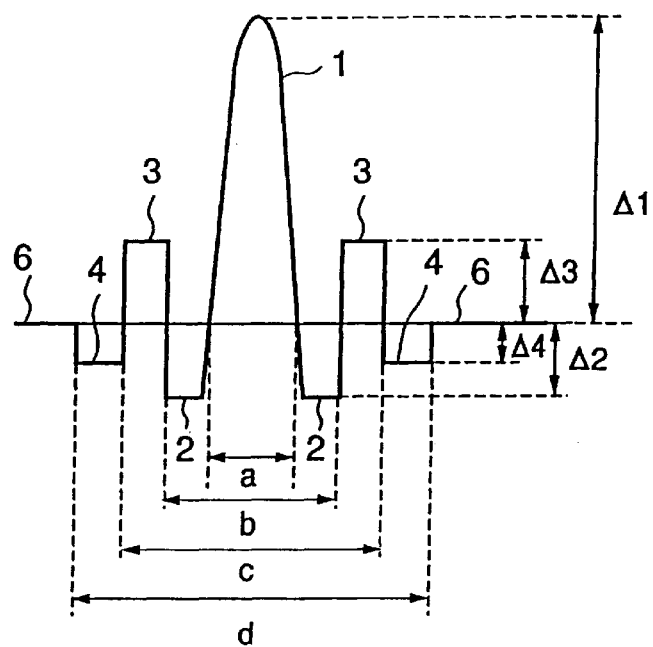
FIG. 2 is an explanatory view showing a refractive index profile construction in a second embodiment of the optical fiber in the invention.

FIG. 2 shows a refractive index profile in a second embodiment of the optical fiber in the invention. The second embodiment approximately has a construction similar to that of the first embodiment. The second embodiment characteristically differs from the first embodiment in that a glass layer having a refractive index lower than that of a reference layer 6 is arranged between a third glass layer 3 and the reference layer 6. This glass layer having the low refractive index is a fourth glass layer 4. The fourth glass layer 4 is adjacently arranged on an outer circumferential side of the third glass layer 3.

In this specification, a relative refractive index difference Δ4 of the fourth glass layer 4 with respect to the reference layer 6 is defined by an approximate formula (5) shown below when the refractive index of a minimum refractive index portion of the fourth glass layer 4 is set to n4. In the second embodiment, the relative refractive index difference Δ4 is set to approximately range from −0.2% to −0.1%.

$$\Delta 4 \approx \{(n4-n6)/n6\} \times 100 \qquad (5)$$

Table 2 shows the relative refractive index difference Δ4 of the optical fiber in each of concrete examples 5 to 8 of the second embodiment, an outside diameter ratio a:b:c:d of the first to fourth glass layers, and characteristics of the optical fiber. In the concrete examples 5 to 8, relative refractive index differences Δ1, Δ2, Δ3 and constant α are set to values similar to those in the optical fiber of the concrete example As shown in the table 2, in the optical fiber of the second embodiment, the cutoff wavelength can be reduced, and it is possible to set an optical fiber also able to cope with wavelength multiplexing transmission in a wavelength band of 1.31 μm as well as a wavelength band of 1.55 μm.

Figure 3:
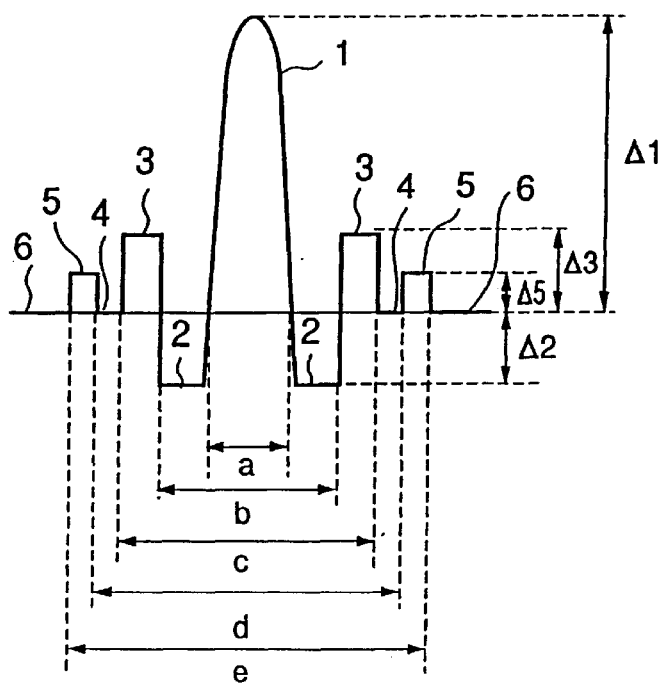
FIG. 3 is an explanatory view showing a refractive index profile construction in a third embodiment of the optical fiber in the invention.

FIG. 3 shows a refractive index profile of a third embodiment of the optical fiber in the invention. The third embodiment approximately has a construction similar to that of the first embodiment. The third embodiment characteristically differs from the first embodiment in that a glass layer having a refractive index higher than that of a reference layer 6 is arranged between a third glass layer 3 and the reference layer 6. This glass layer having the high refractive index is a fifth glass layer 5.

In the third embodiment, a fourth glass layer 4 is adjacently arranged on an outer circumferential side of the third glass layer 3, and has a refractive index equal to that of the reference layer 6. The fifth glass layer 5 is adjacently arranged on an outer circumferential side of the fourth glass layer 4.

In this specification, a relative refractive index difference Δ5 of the fifth glass layer 5 with respect to the reference layer 6 is defined by an approximate formula (6) shown below when the refractive index of a maximum refractive index portion of the fifth glass layer is set to n5. In the third embodiment, the relative refractive index difference Δ5 is set to approximately range from 0.1% to 0.2%.

$$\Delta 5 \approx \{(n5-n6)/n6\} \times 100 \qquad (6)$$

Table 3 shows the relative refractive index difference Δ5 of the optical fiber in each of concrete examples 9 to 12 of the third embodiment, an outside diameter ratio a:b:c:d:e of the first to fifth glass layers, and characteristics of the optical fiber. In the concrete examples 9 to 12, relative refractive index differences Δ1, Δ2, Δ3 and constant α are set to values similar to those in the optical fiber of the concrete example 3 shown in the table 1. The outside diameter ratio a:b:c:d:e of the first to fifth glass layers is a ratio when the outside diameter of the first glass layer 1 is a, the outside diameter of the second glass layer 2 is b, the outside diameter of the third glass layer 3 is c, the outside diameter of the fourth glass layer 4 is d, and the outside diameter of the fifth glass layer 5 is e.

TABLE 3

| UNIT | Δ 5 % | a:b:c:d:e | CORE DIAMETER μm | DISPERSION ps/nm/km | SLOPE ps/nm²/km | Aeff μm² | λc nm | BENDING LOSS (MEASURING VALUE AT 20 mm φ) dB/m | λo nm |
|---|---|---|---|---|---|---|---|---|---|
| CONCRETE EXAMPLE 9 | 0.20 | 1:1.8:2.3:2.8:3.0 | 12.1 | 6.5 | 0.026 | 49.2 | 1505 | 3.0 | 1300 |
| CONCRETE EXAMPLE 10 | 0.10 | 1:1.8:2.5:2.8:3.0 | 12.3 | 6.7 | 0.030 | 48.9 | 1426 | 3.0 | 1327 |
| CONCRETE EXAMPLE 11 | 0.10 | 1:1.8:2.5:2.8:3.2 | 12.4 | 6.4 | 0.027 | 49.0 | 1495 | 3.0 | 1303 |
| CONCRETE EXAMPLE 12 | 0.10 | 1:1.8:2.5:3.0:3:2 | 12.3 | 6.9 | 0.031 | 49.6 | 1468 | 3.0 | 1327 |

λ = 1550 nm

As shown in the table 3, the optical fiber of the third embodiment can have effects similar to those in the first embodiment.

A fabrication example of the optical fiber actually fabricated on the basis of the above simulation results will next be explained. The present inventors fabricated the actual optical fiber on the basis of a design of the optical fiber of the concrete example 2 of the table 1. Table 4 shows results of this fabrication.

TABLE 4

| UNIT | CORE DIAMETER μm | λO nm | DISPERSION ps/nm/km | SLOPE ps/nm²/km | λC nm | Aeff μm² | TRANSMISSION LOSS dB/km | BENDING LOSS (MEASURING VALUE AT 20 mm φ) dB/m |
|---|---|---|---|---|---|---|---|---|
| FABRICATION EXAMPLE 1 | 13.5 | 1337 | 6.8 | 0.027 | 1414 | 42.8 | 0.24 | 3.2 |
| FABRICATION EXAMPLE 2 | 14.0 | 1371 | 7.6 | 0.029 | 1476 | 44.0 | 0.23 | 2.4 |

λ = 1550 nm

As clearly seen from the table 4, similar to design values, the optical fiber of each fabrication example has low dispersion and a low dispersion slope, and has low transmission loss. Further, in the optical fiber of each fabrication example, since the zero dispersion wavelength ($\lambda_0$) is equal to or smaller than 1400 nm, no problem of an interference with pumping light, etc. is caused even when the wavelength division multiplexing transmission is performed in a wavelength band of 1.5 μm by using e.g. the Raman amplifier.

The invention is not limited to each of the above embodiments, but various kinds of embodiment modes can be adopted. For example, the optical fiber of the invention may have a refractive index profile except for the refractive index profile shown in each of the above embodiments. Namely, in the optical fiber of the invention, it is sufficient to set the effective core area, the dispersion value and the dispersion slope at least at a set wavelength or in a set wavelength band in the wavelength band of 1.5 μm to e.g. suitable values as shown in each of the above embodiments, and set the zero dispersion wavelength to 1.4 μm or less. In this construction, it is possible to construct an optical fiber and an optical communication system using this optical fiber in which the wavelength division multiplexing transmission in the wavelength band of 1.5 μm using the Raman amplifier is performed with high quality.

In the above examples, the optical fiber and the optical communication system are applied to the wavelength division multiplexing transmission in the wavelength band of 1.5 μm using the Raman amplifier. However, the optical fiber and the optical communication system of the invention can be also applied to the wavelength division multiplexing transmission using e.g. an erbium-doped optical fiber amplifier except for the Raman amplifier. Further, in accordance with the construction of the optical fiber, the optical fiber and the optical communication system can be also applied to the wavelength division multiplexing transmission in a wavelength band except for the wavelength band of 1.5 μm in addition to this wavelength band of 1.5 μm.

Further, in the above examples, the wavelength band is set to the wavelength band of 1.55 μm. However, the set wavelength band is not particularly limited, but is suitably set in conformity with the wavelength band applied to the wavelength division multiplexing transmission, etc.

What is claimed is:

1. An optical fiber comprising:

an effective core area from 40 μm² to 60 μm² in a set wavelength band of at least one portion of a wavelength band of 1.5 μm;

a dispersion value set to 4 ps/nm/km or more and 10 ps/nm/km or less at a wavelength of 1.55 μm;

a dispersion slope set to a positive value equal to or smaller than 0.04 ps/nm²/km in a wavelength band of 1.55 μm; and a zero dispersion wavelength equal to or smaller than 1.4 μm.

2. An optical fiber according to claim 1, wherein a cutoff wavelength is set to be equal to or smaller than 1.5 μm at a length of 2 m, and a bending loss is set to be equal to or smaller than 5 dB/m at a diameter of 20 mm in the wavelength band of 1.5 μm.

3. An optical fiber according to claim 1, wherein the optical fiber comprises:

multiple glass layers adjacent to each other and having different compositions; and at least three glass layers formed inside a reference layer as a reference of a refractive index distribution among these multiple glass layers;

wherein a maximum refractive index of a first glass layer formed on an innermost side of the optical fiber is set to be higher than the refractive index of said reference layer, a minimum refractive index of a second glass layer as a second layer from an inner side of said optical fiber is set to be lower than the refractive index of said reference layer, and a maximum refractive index of a third glass layer as a third layer from the inner side of said optical fiber is set to be higher than the refractive index of said reference layer.

4. An optical fiber according to claim 3, wherein a glass layer having a refractive index higher than that of the reference layer is arranged between the third glass layer and the reference layer.

5. An optical fiber according to claim 3, wherein a glass layer having a refractive index lower than that of the reference layer is arranged between the third glass layer and the reference layer.

6. An optical fiber according to claim 3, wherein a relative refractive index difference $\Delta 1$ of the maximum refractive index of the first glass layer with respect to the reference layer is set to 0.5% or more and 0.6% or less, a relative refractive index difference $\Delta 2$ of the minimum refractive index of the second glass layer with respect to said reference layer is set to −0.4% or more and −0.1% or less, and a relative refractive index difference $\Delta 3$ of the maximum refractive index of the third glass layer with respect to said reference layer is set to 0.1% or more and 0.4% or less.

7. An optical communication system characterized in that an optical fiber according to claim 1 is applied as an optical transmitting path.

* * * * *